United States Patent [19]
Monot et al.

[11] Patent Number: 5,752,168
[45] Date of Patent: May 12, 1998

[54] MULTISENSOR RECEPTION METHOD FOR A FIXED BASE STATION OF A COMMUNICATIONS NETWORK EXCHANGING DATA WITH MOBILE STATIONS AND DEVICE FOR ITS IMPLEMENTATION

[75] Inventors: Jean-Jacques Monot, Courdimanche; Francois Pipon, Paris; Gilbert Multedo, Vaureal; Pascal Chevalier, Courbevoie, all of France

[73] Assignee: Thomson-CSF, Paris, France

[21] Appl. No.: 620,699

[22] Filed: Mar. 21, 1996

[30] Foreign Application Priority Data

Mar. 28, 1995 [FR] France ................................ 95 03626

[51] Int. Cl.$^6$ .......................................... H04B 17/00
[52] U.S. Cl. ......................... 455/67.3; 455/69; 455/132; 455/307; 375/100
[58] Field of Search ..................... 455/62, 67.3, 69, 455/133, 132, 134, 307, 315; 375/100, 94, 58, 59

[56] References Cited

U.S. PATENT DOCUMENTS 5,202,903  4/1993  Okanoue .......................... 375/100
5,255,210  10/1993  Gardner et al. .................... 364/574
5,471,647  11/1995  Gerlach et al. .................... 455/63

FOREIGN PATENT DOCUMENTS 0 449 327  10/1991  European Pat. Off. .
0 639 897  2/1995  European Pat. Off. .

*Primary Examiner*—Reinhard J. Eisenzopf
*Assistant Examiner*—Darnell R. Armstrong
*Attorney, Agent, or Firm*—Oblon, Spivak, McClelland, Maier & Neustadt, P.C.

[57] ABSTRACT

Disclosed is a method enabling the improvement of the multisensor reception of a system of radiocommunications exchanging signals between at least one fixed base station providing for multisensor reception by means of a network of sensors, and the processing of the signals. This method consists, in a transparent manner perceived from the base station, in computing a weighting vector W for the formation of channels at reception. The weighting vector W is estimated by an adaptive algorithm leading to a maximization of the signal-to-noise ratio. Application: mobile radiocommunications. FIG. 1

3 Claims, 7 Drawing Sheets

| E1/E2 AT INPUT | 3 dB | 3 dB | 6 dB | 6 dB | 10 dB | 10 dB |
|---|---|---|---|---|---|---|
| METHOD USED | MEV | BCF | MEV | BCF | MEV | BCF |
| % OF CASE WHERE E1/E2 IS >THAN 5 dB | 80 | 81 | 100 | 100 | 100 | 100 |
| % OF CASE WHERE E1/E2 IS >THAN 10 dB | 39 | 31 | 73 | 77 | 100 | 100 |
| % OF CASE WHERE E1/E2 IS >THAN 15 dB | 16 | 3 | 41 | 44 | 73 | 77 |
| % OF CASE WHERE E1/E2 IS >THAN 20 dB | 4 | 0 | 21 | 8 | 41 | 48 |
| E1/E2 AT OUTPUT | 16.8 | 9.6 | 23.2 | 17 | 28.7 | 23.6 |

MULTISENSOR RECEPTION METHOD FOR A FIXED BASE STATION OF A COMMUNICATIONS NETWORK EXCHANGING DATA WITH MOBILE STATIONS AND DEVICE FOR ITS IMPLEMENTATION

BACKGROUND OF THE INVENTION

1. Field of the Invention

The present invention relates to a method and to a device for its implementation, enabling the improvement of the reception of messages transmitted on a radio-electrical medium between at least one mobile user and a fixed base station of a communications network.

The invention can be applied to the field of radiocommunications, especially to the transmission of digital data elements between at least one mobile terminal and a fixed data bank or information retrieval service.

2. Description of the Prior Art

The MOBIPAC service exploited by *France Télécom Mobiles Data* enables transmission of this kind. MOBIPAC is a data transmission service for mobile stations, using a radio-electrical medium. It enables two-way dialog, in the form of exchanges of data packets between a mobile terminal and a fixed data bank, irrespectively of the initiator of the transfer, or between two mobile terminals. The term "mobile terminal" is applied to a terminal linked to the network by radio-electrical means without any prejudice to its needs in requirements of mobility, and the term "fixed terminal" is applied to a terminal linked to the network by a wire link. Access to the network by the mobile station is got by means of a base station.

The sharing of radio-electrical resources, which relies on a multiple-access protocol, enables the management, at the same time, of a large number of mobile stations which therefore enjoy the benefit of fast access to the network.

The network is formed by mobile terminals, base stations and a series of hook-up and transit switches. A supervision center fulfils the function of the running and supervision of the installations of the network as well as the management of the technical data pertaining to subscribers.

The link between a mobile terminal and a base station is a two-way link and is achieved through a channel. The channel consists of a rising frequency and a descending frequency in the 410–430 MHz band. The channels are spaced out at 12.5 kHz.

The transmission is done in the form of frames enabling the transfer of packets of data. The modulation used is Gaussian minimum shift keying (GMSK) modulation with an index 0.3 conveying a gross bit rate of 8 kbits/s.

At the physical level, the frame consists of a header and blocks of symbols corresponding to encoded data elements. Each block has 30 bytes coming from 20 bytes of the link layer, encoded by a Hamming code. The header has seven bytes including thirty-two synchronization symbols: these are sixteen bit synchronization symbols (identical for all the messages) and sixteen frame synchronization symbols (specific to the operator).

The minimum message comprises a header and a block, giving a minimum message size of 37 bytes, or 37 ms. Each transmission is preceded by a build-up and stabilization time of the carrier equal to 5 to 10 ms.

The access to the network by the mobile station is got in two ways:

the first one implements a system of random access in time slots defined by the base station. Since all the mobile stations achieve access at the same frequency, it is possible that two or even several mobile stations will seek to transmit a message in the same time interval. This results in collision. The management of collision is done by the base station which sends back an acknowledgment signal when the transmission of the message sent by the mobile station has been successful. This system of random access enables the transmission of packets if their size is compatible with the duration of the slot. Otherwise, the mobile station makes a request for a transfer with a longer duration. The start of the first slot is located 40 ms after the reception of the frame permitting TDMA (Time Division Multiple Access). A hold time of 3.1 ms is planned for the determining, by the mobile stations, of the starting points of the slots. The present duration of the slots is 68 ms for messages with a duration of 37 ms.

The second method implements a system of access following a request for the transmission of large-sized data packets by the mobile station. In this case, the station sends out a specific frame activating the transmission, by the mobile station, of a packet corresponding to the size transmitted in the request for access to the network. The mobile station has 20 ms to carry out the up-and-down reversal and send its message authorized by the specific frame.

Operations of transmission between the base station and the mobile station use a principle of automatic error correction. Thus, the mobile station or the base station may request an acknowledgment signal upon the dispatch of a message in order to manage collisions or the loss of messages because of the conditions of propagation. Should the transmitter not receive this acknowledgment signal, it performs a new test. The performance characteristics of this transmission are nevertheless limited for low power values of transmission of the mobile stations and by the large number of collisions encountered on one and the same slot.

SUMMARY OF THE INVENTION

The invention is aimed at overcoming the above-mentioned drawbacks. To this end, an object of the invention is a method enabling the improvement of the multisensor reception of a radiocommunications system exchanging signals between at least one mobile station and at least one fixed base station providing for a multisensor reception by means of a network of sensors and the processing of the signals, wherein said method consists, in a transparent manner seen from the base station, in computing a channel-formation weighting vector at reception, the weighting vector being estimated by an adaptive algorithm leading to a maximization of the signal-to-noise ratio.

The method according to the invention has the advantage of being transparent with respect to the base station and enables:

chiefly, the improvement of the reception on the part of low power terminals or terminals having an unfavorable connection balance, and on a secondary basis, the limitation of collision during access by one or more mobile stations to one and the same slot.

BRIEF DESCRIPTION OF THE DRAWINGS

Other characteristics and advantages of the invention shall appear more clearly from the following description, made with reference to the appended figures, of which:

FIG. 10 is a table giving the values of the ratio $E_1/E_2$ at output of the MEV and BCF processing operations for different values of the input ratio $E_1/E_2$ where E1 and E2 are the power values of the two transmissions simultaneously reaching the network (on an access phase)

MORE DETAILED DESCRIPTION

The invention consists in focusing the reception towards the strongest signal of the transmission channel. This enables an improvement in the reception of the low-power signals. As shall be indicated with respect to the performance characteristics, this mode of operation also enables a substantial improvement of reception for two signals transmitted in the same channel.

For, the principle used enables an improvement of the signal-to-noise ratio (SNR) or signal-to-noise+interference ratio (SNIR) in the presence of a second call, of the strongest call in the channel.

Figure 1:
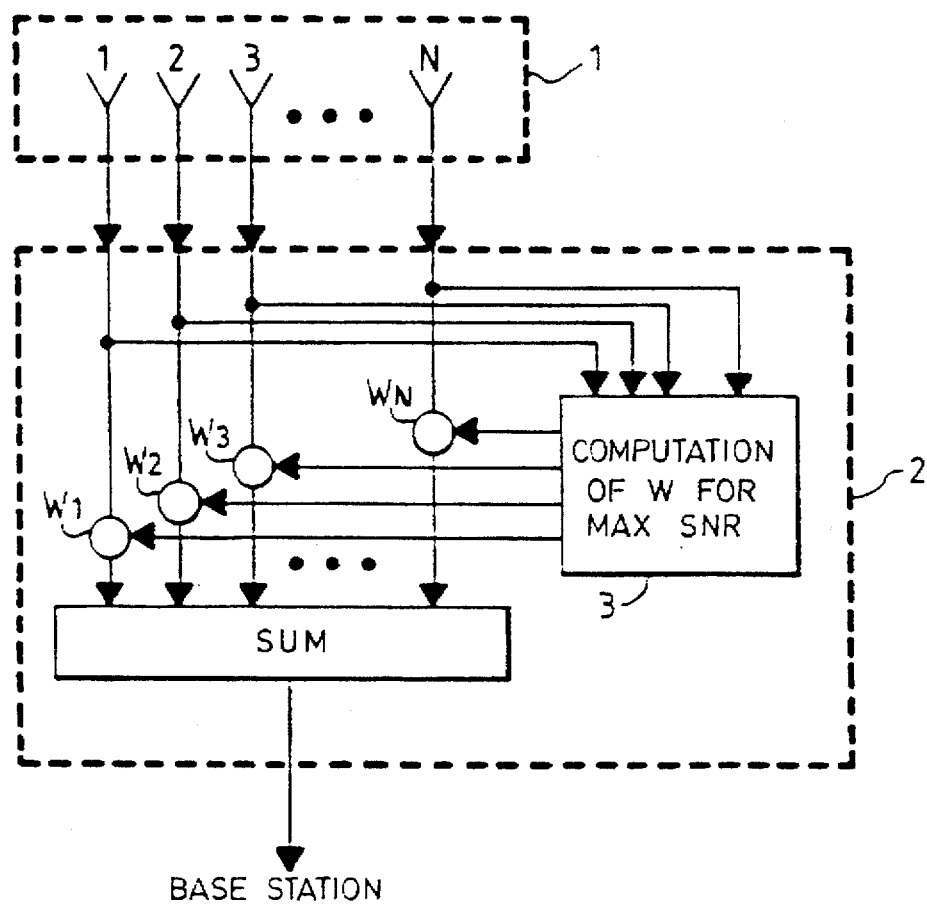
FIG. 1 is a diagram showing the principle of a multisensor reception method according to the invention.

The method according to the invention, shown schematically in FIG. 1, is based on a multisensor reception of a signal sent by a mobile station, comprising a network of N omnidirectional antennas 1 coupled to a channel-forming unit 2.

The result of the reception is then transmitted to the fixed base station.

The multisensor reception processing is done permanently without taking account of the phase of operation of the base station, in access or traffic mode.

The principle of processing is described here below.

It is assumed initially that the link is not being interfered with. The signal received by the network of sensors can therefore be written as follows:

$$X(t)=\alpha \cdot s(t) \cdot S + B(t)$$

where s(t) is the signal sent out by the mobile station, $\alpha$ is the amplitude on a determined sensor chosen as the reference sensor, for example the sensor 1, S is the direction vector of the signal sent out by the mobile station, B(t) is the noise.

The direction vector S defined with respect to the reference sensor is expressed as follows:

$$S = \begin{bmatrix} 1 \\ a_2 \cdot e^{j\phi_2} \\ a_3 \cdot e^{j\phi_3} \\ \cdot \\ \cdot \\ \cdot \\ a_N \cdot e^{j\phi_N} \end{bmatrix} \quad (1)$$

where $a_k$ is the difference in gain between the sensor k and the sensor 1 (essentially due to the problems of coupling between sensors) and $\phi_k$ is the differential phase between the sensor k and the sensor 1. The parameters $a_k$ and $\phi_k$ depend on the direction of arrival of the useful signal.

After the acquisition of a vector X(n) corresponding to the signal X(t) received by the network of sensors 1 after sampling at a determined frequency, for example Fe=16 kHz, the method according to the invention carries out a computation 3 of the weighting vector W of the reception channels which leads to a maximization of SNR at the output of the processing operation. The SNR is expressed by the following formula, assuming that the noise level is identical at each sensor k=1 to K:

$$SNR = \frac{\pi_s \cdot |W^+ \cdot S|^2}{\sigma^2 W^+ W} \quad (2)$$

where $\Pi_s$ defines the power of the useful signal received at the reference sensor and $\sigma^2$ is the power of the noise superimposed on the useful signal, with + as an exponent referring to the transposition-conjugation operation.

The solution of this problem is $W=\lambda \cdot S$ ($\lambda$ as a complex number).

Two method can be used to compute the vector W:

a first method estimates the eigen vector associated with the maximum eigen value of the correlation matrix $R_{xx}$ of the signal x(t) received on the network of sensors, a second method computes the correlation between the received signal $x_1$ on a reference sensor and the signals received by the other sensors.

The first method, hereinafter called maximum eigen vector or MEV is based on the principle that the desired vector W is the eigen vector corresponding to the maximum eigen value of the matrix of correlation of the signals received on the network of sensors $R_{xx}$. This principle is demonstrated by computing the matrix of correlation of the signals received on the network of sensors:

$$R_{xx}=E[X(t) \cdot X^+(t)]=\Pi_s SS^+ + \sigma^2 \cdot I \quad (3)$$

where $E[X(t) \cdot X^+(t)]$ defines the mathematical expectation.

By carrying out a decomposition of this matrix into eigen vectors and eigen values, there is obtained an eigen value equal to $\Pi_s$ with an eigen vector S and K−1 eigen values equal to $\sigma^2$.

The weighting vector W is therefore the solution of the following problem:

$$\begin{cases} \max P = W^+ R_{xx} W \\ W^+ W = 1 \end{cases} \quad (4)$$

where P is a criterion corresponding to the power of the signal at output of the antenna defined by W and $W^+W=1$ is the constraint of maximization.

To estimate the vector W adaptively, the method according to the invention uses an algorithm of the gradient on the basis of the following initial condition:

$$W(0) = C = \begin{bmatrix} 1 \\ 0 \\ \cdot \\ \cdot \\ \cdot \\ 0 \end{bmatrix} \quad (5)$$

The MEV algorithm is then defined as follows:

$$\begin{cases} \tilde{W}(n) = W(n-1) + \mu \cdot \nabla P_{W(n-1)} \\ \nabla P_{W(n-1)} = R_{xx} \cdot W(n-1) \end{cases} \quad (6)$$

where $\nabla P_{W(n-1)}$ corresponds to the gradient of the power P taken at $W(n-1)$.

The pitch $\mu$ of the computation of the gradient is a major parameter: the greater this pitch, the faster is the convergence, but the greater are the errors of convergence. A compromise has to be found. In order to limit the losses, the parameter is made adaptive as a function of the signal-to-noise ratio. The following is therefore chosen:

$$\mu = \frac{\nu}{X^+(n) \cdot X(n)}$$

Finally, to meet the constraint $W^+W=1$ (modulus=1), a standardization is performed on W(n):

$$W(n) = \frac{\tilde{W}(n)}{\|\tilde{W}(n)\|} \quad (7)$$

$R_{xx}$ being not known in principle, $R_{xx}$ is replaced by an instantaneous estimate:

$$R_{xx} = X(n) \cdot X^+(n) \quad (8)$$

The algorithm MEV then becomes:

$$W(0) = C \quad (9)$$

$$\tilde{W}(n) = W(n-1) + \mu \cdot X(n) X^+(n) \cdot W(n-1) \quad (10)$$

$$W(n) = \frac{\tilde{W}(n)}{\|\tilde{W}(n)\|} \quad (11)$$

The second method referred to hereinafter in the description by the initials BCF or blind channel formation consists in computing the vector of intercorrelation $r_{Xx1}$ between the signal X received by the sensors and the signal $x_1$ received on the reference sensor, and then in standardizing by the power received on the first sensor to obtain the vector W. The vector W is therefore expressed by the following formula:

$$W = \frac{r_{Xx_1}}{E|x_1(t)|^2} = \frac{E[X(t) \cdot x_1^*(t)]}{E|x_1(t)|^2} \quad (12)$$

$$= \frac{E[[\alpha \cdot s(t) \cdot S + B(t)] \cdot (\alpha \cdot s^*(t) + b_1^*(t))]}{E|x_1(t)|^2} =$$

$$= \frac{\pi_s \cdot S + \sigma^2 \cdot \begin{bmatrix} 1 \\ 0 \\ \cdot \\ \cdot \\ \cdot \\ 0 \end{bmatrix}}{\pi_s + \sigma^2}$$

When the signal power $\Pi_s$ is strong enough with respect to the noise power $\sigma^2$, the vector W is proportional to the vector S and therefore enables the a conventional channel formation in the direction of the useful signal. In other words, the vector W leads to the maximizing of the signal-to-noise ratio at output of processing.

The vector W has been computed here above in assuming that the statistics of the signals are known. In practice, these statistics are unknown. In this method, the vector W is estimated by an adaptive algorithm, using an decay factor $\lambda$ so as to continue all the non-stationary states features (non-stationary state of the propagation channel or arrival of a new mobile station). At each new sample, the vector W used is expressed as follows:

$$W(n) = \frac{\sum_{i=1}^{n} \lambda^{n-i} \cdot X(i) \cdot x_1^*(i)}{\sum_{i=1}^{n} \lambda^{n-i} \cdot \|x_1^*(i)\|^2} = \frac{r_{Xx1}(n)}{\pi_1(n)} \quad (13)$$

where * as an exponent corresponds to the complex conjugation operator.

Furthermore, since the reference sensor, the sensor 1 in the above formulae, could be assigned a temporary fading, the method uses two reference sensors, for example the sensor 1 and the sensor 2, the choice of which is made after assessment of the received signal power. At each new sample, the method performs the following sequencing operation:

computation of the power values of signals received at the sensors 1 and 2: $\Pi_1(n)$ and $\Pi_2(n)$, computation and updating of the reference correlations $r_{Xx1}(n)$ and $r_{Xx2}(n)$, selection of the sensor having the greatest power and computation of the weighting vector:

$$W(n) = \frac{r_{Xxk}(n)}{P_k(n)} \quad (14)$$

filtering by means of the previous vector W:

$$y(n) = W(n)^+ X(n) \quad (15)$$

In order to avoid an excessively frequent changing of reference sensor, a change of this kind is done only if the difference in power is greater than a defined threshold (for example 10 dB):

$$abs(\Pi_1 - \Pi_2) > 10 \, dB \quad (16)$$

Two types of observations emerge for these two methods:

To carry out one of the two methods, it is not necessary to have a wave edge model. In particular, it is not necessary to calibrate the network of sensors (such a calibration would be necessary if it was desired, from the estimation of the vector S, to estimate the direction of arrival of the signal sent out by the mobile station, which is not the case of the invention).

Should the useful signal X(t) comprise several propagation paths, the previous two methods are still valid. Indeed, the signal X(t) received by the sensors is expressed as follows:

$$X(t) = \sum_{i=1}^{P} \alpha_i \cdot s(t - \tau_i) \cdot S_i + B(t) \quad (17)$$

where P is the number of paths and $\tau_i$ is the time of delay of propagation of the path i.

All the paths reach the network of sensors with a delay time far smaller than the symbolic duration which is generally 125 ms. It is therefore possible to write:

$$s(t-\tau_i) = s(t), \forall i \quad (18)$$

and we obtain:

$$x(t) = s(t) \cdot [\Sigma \alpha_i \cdot S_i] + B(t) \quad (19)$$

giving:

$$X(t) = \alpha' \cdot s(t) \cdot S' + B(t)$$

S" is a composite direction vector bringing into play all the paths associated with the useful signal, which may be estimated by computing the vector W by one of the two methods.

The two methods are compared here below in terms of computation power and performance characteristics.

In terms of computation power, the MEV method is costlier than the BCF method because, at each iteration, it includes a reverse computation and a standard reverse computation.

In terms of performance characteristics, the two methods are equivalent on stationary single-path channels or Rayleigh channels. By contrast, the MEV method is superior on a channel having two Rayleigh paths: it takes account of all the sensors to estimate the vector S and is not penalized by any fading on one of the sensors which may be the reference sensor for the BCF method.

This phenomenon could also be present if a major substantial coupling were to appear between the sensors.

In conclusion, the MEV method is preferable if the computation power allows it.

The performance characteristics of the two methods obtained from an exemplary non-restrictive simulation are given here below.

The model used to perform the simulations corresponds to a model conventionally used in mobile telephony systems.

The signal x(t) received by the system is supposed to be formed by a transmission comprising one or two paths and a Gaussian white noise. This signal is expressed by:

$$X(t) = \alpha_1 \cdot s(t) \cdot S_1 + \alpha_2(t) \cdot s(t) \cdot S_2 + B(t) \quad (20)$$

where:

$\alpha(t)$ represents the variation of the channel which is constant for a stationary or variable channel for a Rayleigh fading, s(t), is the modulating signal sent by the mobile station ($\alpha_2(t)=0$ for a single-path channel), $S_1$ and $S_2$ are the respective direction vectors pertaining to the two propagation paths, and B(t), is the noise received by the station.

S represents the direction vector without, for the time being, taking account of the coupling between the sensors and is expressed as follows:

$$S = \begin{bmatrix} 1 \\ e^{j\phi 1} \\ \cdot \\ \cdot \\ \cdot \\ e^{j\phi k} \end{bmatrix} \quad (21)$$

The simulations have been performed for both methods (BCF and MEV) under the same conditions in order to compare their performance characteristics. Two values have been tested for the parameter ν of the gradient according to the MEV method: 0.2 and 0.5 for the speeds of convergence. The value 0.2 has been chosen as the optimum value for this example.

The decay factor λ of the algorithm of the BCF method is taken to be equal to 11/12=0.917.

In the example of a system working by frames, the minimum size of which is 37 ms, with transmission of a non-modulated carrier for 5 to 10 ms before the data elements, the formation of channels achieves an optimum gain in less than 1 ms after the start of the transmission of the carrier, as can be seen in the following simulations.

It can also be seen that this positioning time varies with the signal-to-noise ratio.

In the case of the MEV method, the swiftness of convergence of the algorithm depends on the value used for the constant ν in the algorithm of the gradient.

Figure 2:
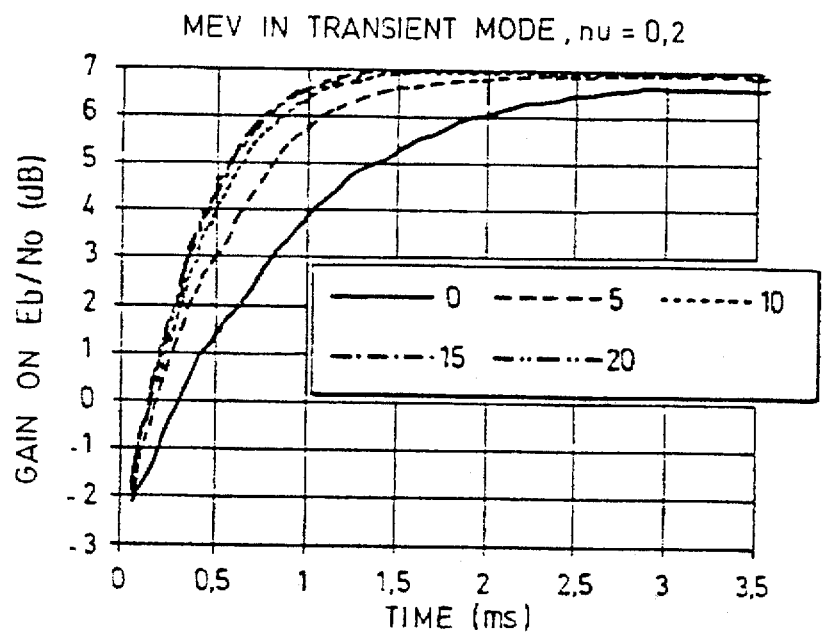
FIGS. 2 and 3 show the convergence time of the MEV (maximum eigen vector) algorithm respectively for $\nu=0.2$ and $\nu=0.5$ for different values of the ratio Eb/No at input.
Figure 3:
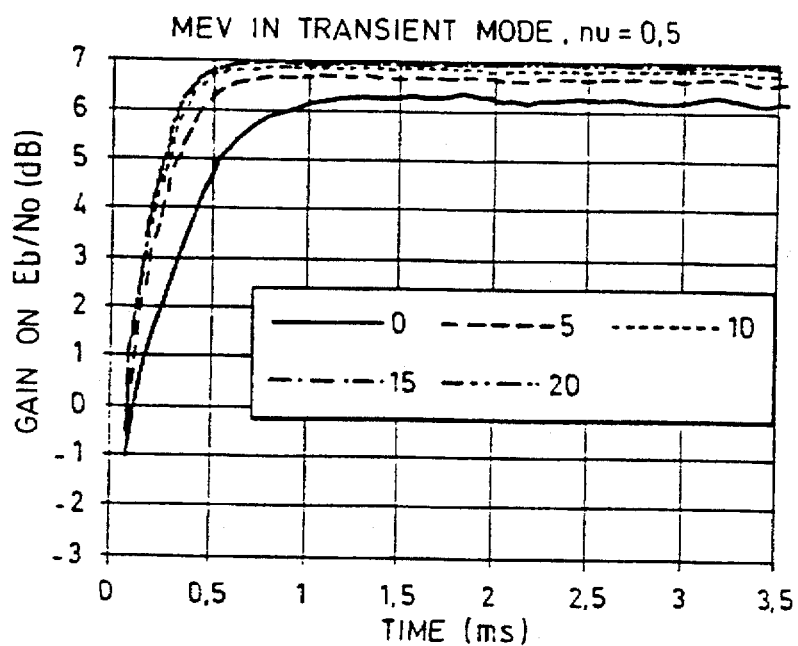
Figure 4:
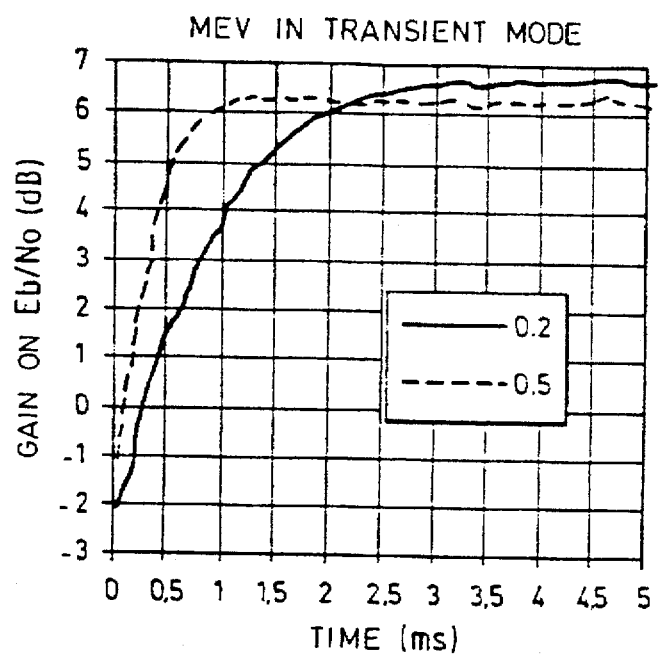
FIG. 4 shows a comparison of the convergence time of the MEV algorithm for the values $\nu=0.2$ and $\nu=0.5$ for the ratio Eb/No=0 dB.

The following three FIGS. 2, 3 and 4 pertain to the convergence time of the algorithm according to the MEV method. They represent the curves giving the value of the gain on different values on the ratio Eb/No at output of processing as a function of the convergence time.

FIGS. 2 and 3 respectively show these curves for ν=0.2 and 0.5 and for different values of the ratio Eb/No at input. The ratio Eb/No corresponds to the signal-to-noise ratio at output of the matched filter. Eb corresponds to the energy per bit transmitted and No to the spectral noise density.

For ν=0.5 (respectively ν=0.2), the MEV method converges in 0.5 ms (and 1 ms respectively) when the input ratio Eb/No is greater than 5 dB. The criterion of convergence is at least 1 dB of the value obtained at the end of convergence.

Furthermore, the theoretical maximum gain is 7 dB (10 logK=7 for K=5 sensors). For ν=0.2, the gain once the convergence of the algorithm is established (τ>1.5 ms) is at less than 0.5 dB of this maximum value when the input ratio Eb/No is greater than 5 dB.

FIG. 4 compares the convergence time of the MEV algorithm for the values ν=0.2 and 0.5 for Eb/No=0 dB. It can be seen that there is a swiftness of convergence for ν=0.5, but with a gain and stability that is subsequently smaller.

Figure 5:
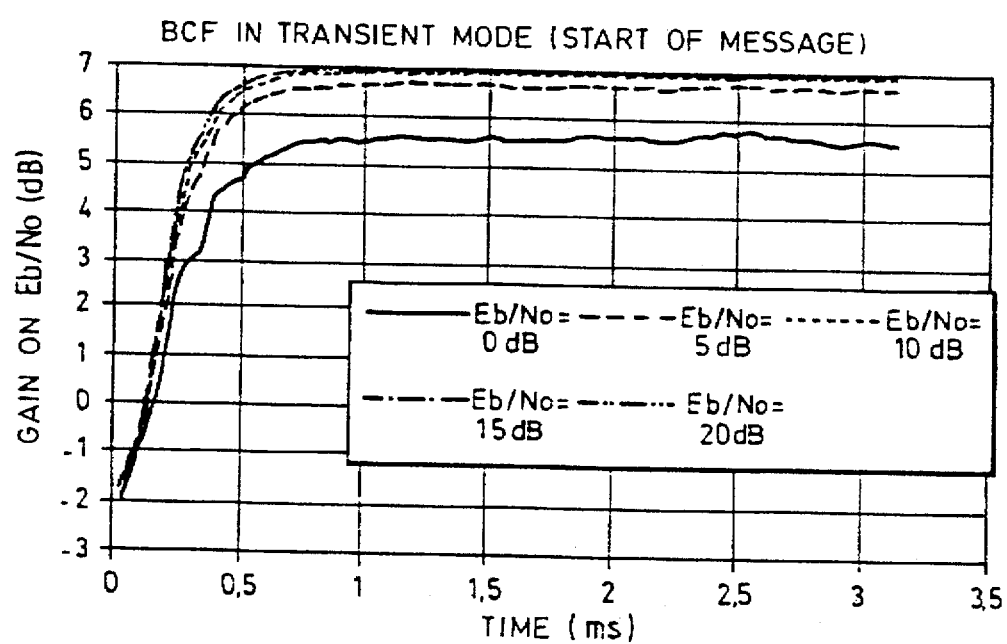
FIG. 5 shows the convergence time of the BCF (blind channel formation) algorithm for the different values of the ratio Eb/No.

FIG. 5 illustrates the convergence time of the algorithm according to the BCF method.

In the case of the BCF method, the antenna gain is at least 6 dB as of 500 ms for a value of Eb/No at input of 5 dB and the algorithm converges in 750 ms in the most unfavorable case (Eb/No=0 dB).

In conclusion, whatever the method used, the processing is completely transparent for the base station and converges in less than 1 ms.

The mode of operation in channel formation according to the BCF method has high performance characteristics as regards the improvement of the reception. An advantage is given to the MEV method which does not take a sensor as an arbitrary reference for the processing.

Figure 6:
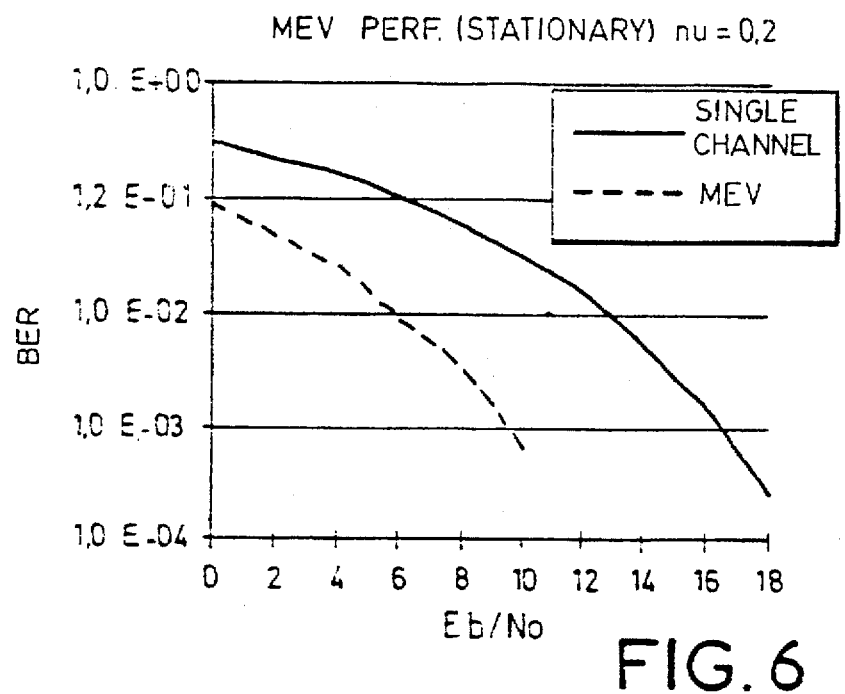
FIG. 6 shows the curves giving the variations of the BER (binary error rate) as a function of the input ratio Eb/No for the MEV method with $\nu=0.2$ and for a single-channel method in the case of a stationary single path.

FIG. 6 shows the curves of the BER as a function of the ratio Eb/No (BER designates the binary error rate obtained at output of the processing system) for the MEV method (with ν=0.2) and for a single-channel method that makes direct use of the signal coming from a sensor. The useful channel is a stationary single-path channel. The MEV method enables a gain of 7 dB. To reach the point of operation at BER=$10^{-2}$, the ratio Eb/No should be equal to Eb/No=6 dB. For such a value of the ratio Eb/No, a single-path method leads to a BER value that is ten times greater.

Figure 7:
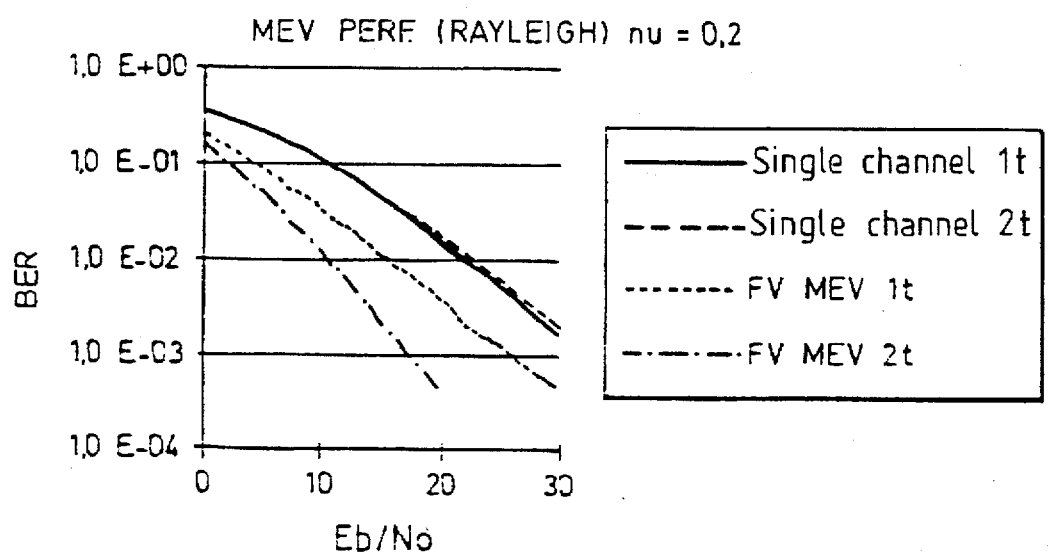
FIG. 7 shows the curves giving the variations of the BER as a function of the input ratio Eb/No for the MEV method with $\nu=0.2$ and for a single-channel method in the case of the Rayleigh single path and the Rayleigh dual path.

Even in the presence of multiple paths, this mode of operation enables an appreciable gain as compared with the single-sensor configuration: in a Rayleigh single-path configuration, the gain for a BET equal to $10^{-2}$ is 6.5 dB whereas it is 10 dB in a configuration taking two Rayleigh paths of the same power. These performance characteristics are shown in FIG. 7.

As can be seen in the above results, the multipath configuration enables a multiple sensor reception implementing the MEV method to achieve diversity on its sensors and consequently improve the performance characteristics to an even greater extent. This diversity is due to the recombination of the paths: at a given instant, the signal level received by each of the sensors is different and the MEV method enables the sensors on which the level received is the highest to be taken into account in a preferred way.

Figure 8:
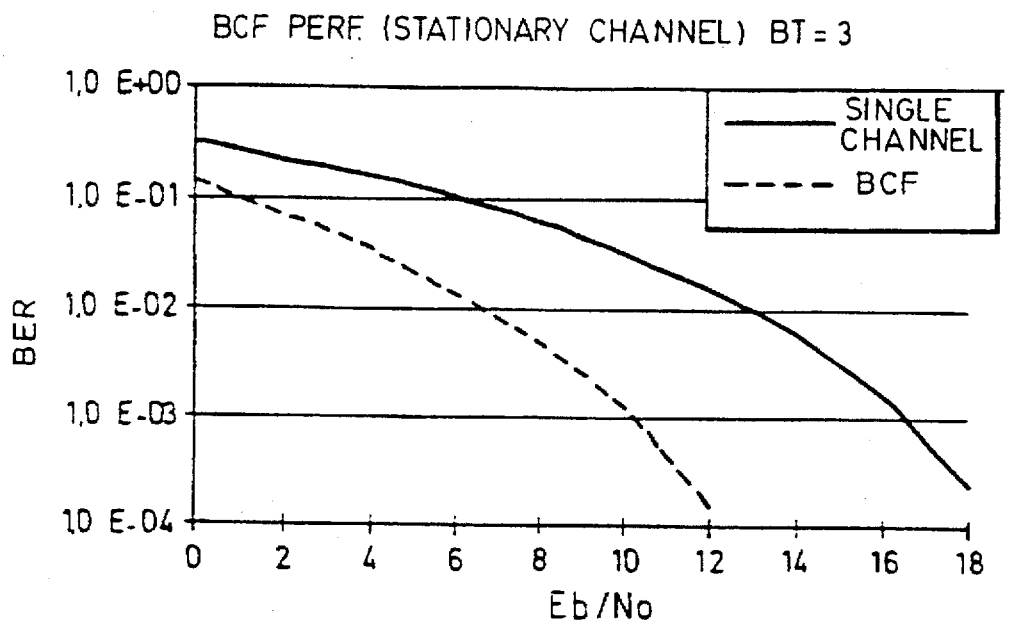
FIG. 8 shows the curves giving the variations of the BER as a function of the input ratio Eb/No for the BCF method (BT=3, BT being the passband x time, also called the independent snapshot value) and for a single channel method in the case of a stationary single path.

In the same way as for the MEV method, for a five-sensor configuration, the gain in Eb/No is 7 dB with the BCF method. The performance characteristics of the BCF method in this configuration are shown in FIG. 8.

Figure 9:
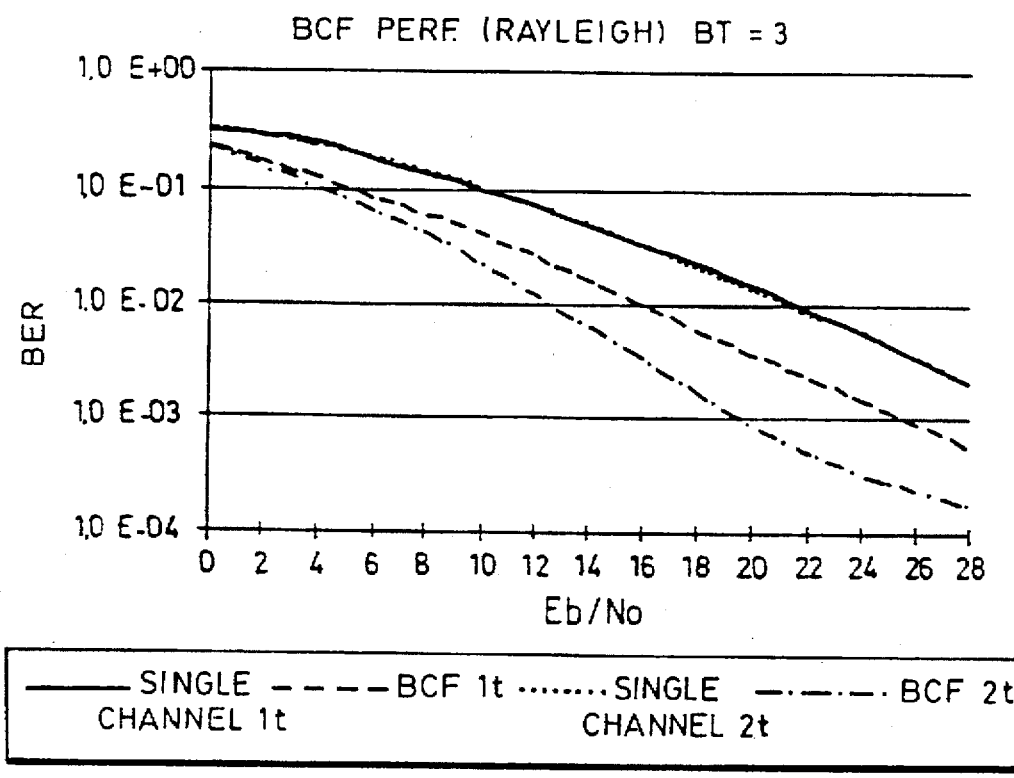
FIG. 9 shows the curves giving the variations of the BER as a function of the input ratio Eb/No for the BCF method (BT=3) and for a single-channel method in the case of the Rayleigh single path and the Rayleigh dual path.

FIG. 9 shows the performance characteristics of the BCF method in the same configuration as compared with the single-channel methods in the presence of multiple paths. It can be seen that for the BCF method stands up slightly less efficiently than the MEV method to a multipath configuration. This is because of the presence of fading on the reference sensor. The performance characteristics are comparable for BER values of over $10^{-3}$ and poorer for values below $10^{-3}$).

A multiple sensor reception according to the invention improves the separation of two calls gaining access to the same slot. This can be seen hereinafter in the description for the BCF method.

Furthermore, simulations performed for the two methods show their effectiveness in dealing with this problem.

The BCF method enables an improvement of the signal-to-noise ratio of the strongest signal. Assuming that the network receives two transmission (1 and 2), the signal received by the network of sensors is expressed by the following formula:

$$X(t)=\alpha_1 \cdot s_1(t) \cdot S_1 + \alpha_2 \cdot s_2(t) \cdot S_1 + B(t) \quad (22)$$

Asymptotically, the vector W tends towards the following value:

$$W = \frac{E|X(t) \cdot x_1^*(t)|}{E|x_1^*(t)|^2} = \frac{\pi_1 \cdot S_1 + \pi_2 \cdot S_2 + \sigma^2 \cdot \begin{bmatrix} 1 \\ 0 \\ \cdot \\ \cdot \\ \cdot \\ 0 \end{bmatrix}}{\pi_1 + \pi_2 + \sigma^2} \quad (23)$$

The vector W thus computed is therefore, when the power values $\Pi_1$ and $\Pi_2$ pertaining respectively to the power values of the signals $s_1$ and $s_2$ are power values sufficiently strong with respect to the power of the noise $\sigma^2$, the sum of a channel formation in the direction of the signal $s_1$, and a channel formation in the direction of the signal $s_2$. This sum is weighted by the respective power values of two transmissions: the lobe formed in the direction of the strongest signal is all the greater as the power of the signal is great.

A more precise computation of the ratio $P_1/P_2$ between the output power values of the signal $s_1$ and $s_2$ is given here below:

$$\frac{P_1}{P_2} = \frac{\pi_1 \cdot |W^+ \cdot S_1|^2}{\pi_2 \cdot |W^+ \cdot S_2|^2} = \quad (24)$$

$$\frac{\pi_1 \cdot |\pi_1 \cdot S_1^+ \cdot S_1 + \pi_2 \cdot S_2^+ \cdot S_1 + \sigma^2|^2}{\pi_2 \cdot |\pi_1 \cdot S_1^+ \cdot S_2 + \pi_2 \cdot S_2^+ \cdot S_2 + \sigma^2|^2}$$

Let ρ be the coefficient of spatial correlation between the signal $s_1$ and the signal $s_2$:

$$\rho = \frac{S_1^+ \cdot S_2}{\sqrt{(S_1^+ \cdot S_1) \cdot (S_2^+ \cdot S_2)}} \quad (25)$$

It is furthermore assumed that all the sensors receive the same signal power:

$$S_1^+ \cdot S_1 = S_2^+ \cdot S_2 \quad (26)$$

$$\frac{P_1}{P_2} = \frac{\pi_1 \cdot |\pi_1 + \rho \cdot \pi_2 + \sigma^2|^2}{\pi_2 \cdot |\pi_2 + \rho^* \cdot \pi_1 + \sigma^2|^2} \quad (27)$$

When the two signals are perfectly decorrelated in spatial terms (ρ=$0_2$), we obtain:

$$\frac{P_1}{P_2} = \frac{\pi_1}{\pi_2} \cdot \left( \frac{\pi_1}{\pi_2} \right). \quad (28)$$

Thus, the ratio between the input power values of the two signals is amplified. For example, if $\Pi_1/\Pi_2$=10 dB at input (with the demodulation of the signal 1 being impossible), we obtain $P_1/P_2$=30 dB at the output of processing (perfect demodulation).

When the two signals are perfectly correlated (ρ=1), we obtain:

$$\frac{P_1}{P_2} = \frac{\pi_1}{\pi_2}$$

and the ratio between the power values of the two signals is not modified.

The demonstration in this case of the MEV method is more complex. The simulations also show its efficient operation and even its superiority with respect to the BCF.

Thus, should two mobile stations communicate in the same channel, which corresponds to a situation of collision in the access phase, the method according to the invention "captures" the strongest signal. It increases the relative level of the two signals by giving preference to the strongest signal. Depending on the method used, the gain varies with a non-negligible advantage for the MEV method.

The table of FIG. 10 shows the results of a simulation performed in the case where two mobile stations 1 and 2 come to the network on the same channel of frequencies. The two mobile stations 1 and 2 have respective transmission power values of $E_1$ and $E_2$, and the simulation causes a variation between 0° and 360° of the azimuthal values of the mobile stations 1 and 2° , as well as of the value of the ratio $E_1/E_2$ at input of processing (0 dB, 3 dB, 6 dB and 10 dB). The table gives the average levels for the ratio $E_1/E_2$ at output of the processing operations MEV and BCF as well as the percentage of cases where the ratio $E_1/E_2$ at output is greater than a given value. For example, if the input ratio $E_1/E_2$ is equal to 6 dB, a single-channel processing cannot demodulate either of the two transmissions. By contrast, with the MEV processing (an BCF processing respectively), in 41% (and 44% respectively) of the cases, the ratio $E_1/E_2$ will be greater than 15 dB and the single-channel processing placed at output of the single-channel system could demodulate the weakest transmission.

Consequently, the method may be used even for the access phases for it enables a demodulation of the strongest signal when the two mobile stations are separated spatially in an adequate way.

Figure 11:
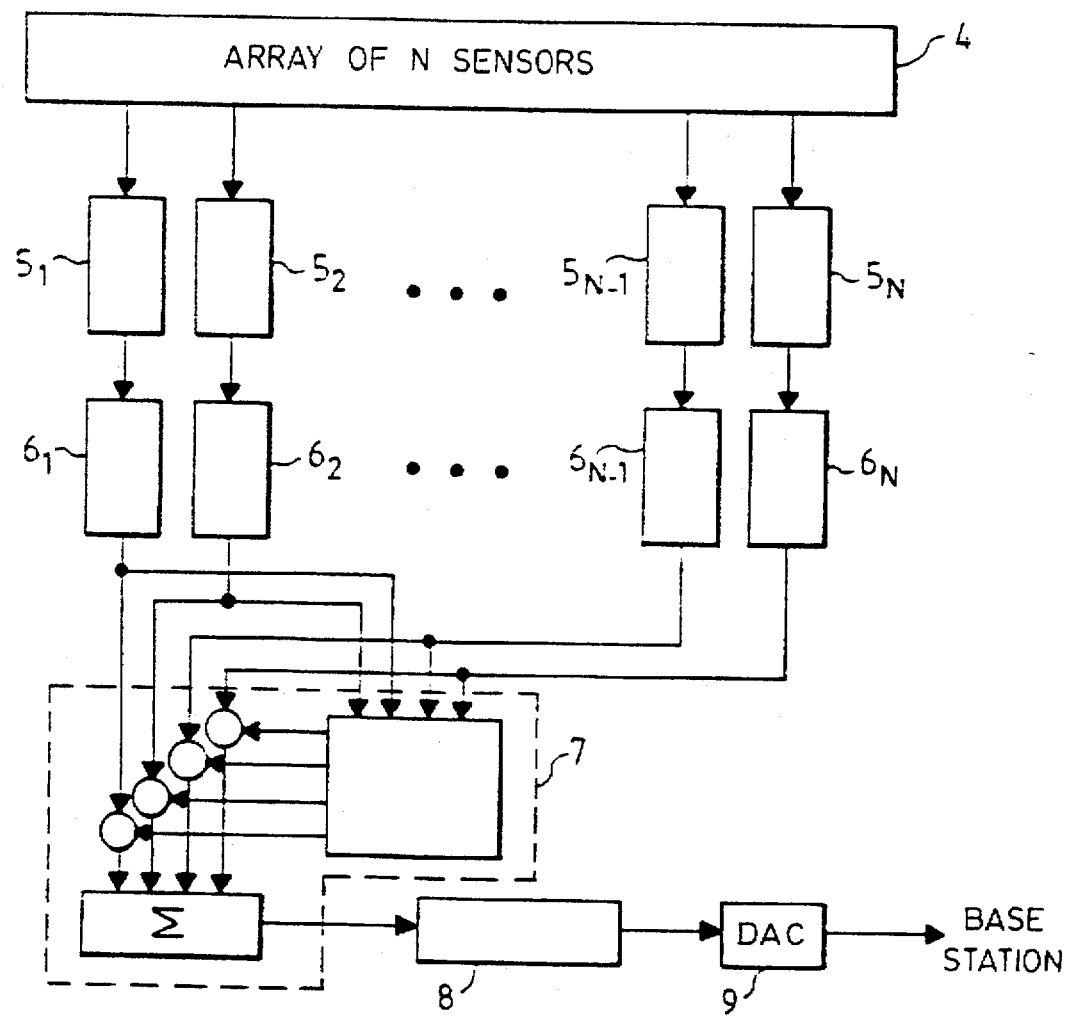
FIG. 11 shows a functional diagram of a multisensor reception device for the implementation of the method according to the invention.

A functional drawing of a multisensor reception device for the implementation of the method according to the invention is illustrated in FIG. 11.

The multisensor reception device according to the invention comprises:

- a network of sensors 4 comprising, for example, a number N of omnidirectional antennas,

- means $5_1$ to $5_N$ for the analog reception of a specific number N of channels corresponding to the number N of sensors of the network 4. The analog reception means enable the selection of the communications channel and the transposition of the signal received in a specified band to an intermediate frequency Fi compatible with the sampling operation. A automatic gain control (AGC) function may be implanted therein in order to have a dynamic range of reception and improve the sensitivity,

- means $6_1$ to $6_N$ of digitization and passage into baseband for each of the channels respectively. The means $6_1$ to $6_N$ for digitization and passage into baseband enable the sampling of the signal on a number of bits compatible with the dynamic range of the signal and the transposition of this signal to the baseband in order to give the channel formation unit 2 a complex signal,

- a digital channel formation processor 7 demarcated by a discontinuous closed line within which there is the block diagram 2 of FIG. 1, implementing either of the above-described algorithms. The channel formation processor 7 gives the output signal on a channel on the basis of the N signals received,

- a digital frequency discrimination means 8 carrying out the demodulation. The frequency discrimination means 8 carries out a frequency demodulation in order to have available a signal whose value corresponds to the demodulated data elements, and

- a digital-analog converter 9. The DAC (digital-analog converter) 9 converts the digital signal into an analog signal compatible with the input interface of the demodulator of the base station which is not shown.

What is claimed is:

1. A method enabling the improvement of the multisensor reception of a radiocommunications system exchanging signals between at least one fixed base station providing for multisensor reception by means of a network of sensors and processing of the signals, by computing a channel-formation weighting vector W at reception in a transparent manner seen from the base station, wherein said weighting vector W is an eigen vector corresponding to a maximum eigen value of a matrix $R_{xx}$ of one of the signals received by said network of sensors, said computing the weighting vector W comprising the steps of:

acquiring a vector (X(n)) corresponding to a signal received by the network of sensors, after sampling at a determined frequency;

estimating said weighting vector W according to an algorithm of the gradient made adaptive by the updating, at each new sample, of the pitch µ of the computation of the gradient, the pitch µ being determined to limit the losses as a function of the signal-to-noise ratio;

standardizing the estimated vector W to ensure a modulus equal to 1 according to a criterion of maximazation; and filtering data elements by means of the weighting vector W.

2. A method enabling the improvement of the multisensor reception of a radiocommunications system exchanging signals between at least one fixed base station providing for multisensor reception by means of a network of sensors, wherein at least two sensors are reference sensors, and processing of the signals, comprising the steps of:

acquiring a vector (X(n)) corresponding to one of the signals received by said network at a determined sampling frequency;

computing vectors of intercorrelation of a signal (X(xn)) received by the network of sensors and said signals received respectively for the reference sensors, the computation being updated at each new sample;

selecting that reference sensor, that has a highest power value with a difference greater than a determined threshold;

computing a weighting vector (W(n)) by taking the ratio between an intercorrelation vector corresponding to a selected sensor and the power of a signal received by this sensor; and filtering the data elements by means of the weighting vector W.

3. A reception device for the implementation of the method according to any of the claims 1 to 2, comprising a network of a determined number N of sensors, analog multichannel reception means enabling the selection of a communications channel and the transposition of the signal received in a determined band into an intermediate frequency compatible with a determined sampling, means of digitization and passage into baseband, wherein said device further comprises digital channel-formation means implementing the adaptive algorithm leading to a maximization of the signal-to-noise ratio, a frequency discrimination means performing a frequency demodulation in order to have available a signal whose value corresponds to the modulated data elements and a digital/analog converter converting the digital signal into an analog signal compatible with the input interface of the base station to which the reception device is linked, the reception device being totally transparent with respect to the base station.

* * * * *